United States Patent
Bar-Yaakov et al.

(10) Patent No.: US 8,329,790 B2
(45) Date of Patent: Dec. 11, 2012

(54) POLYPROPYLENE BASED FORMULATIONS

(75) Inventors: Yoav Bar-Yaakov, Lehavim (IL); Ita Finberg, Beer-Sheva (IL); Smadar Hini, Metar (IL)

(73) Assignee: Bromine Compounds Ltd., Be'er-Sheva (IL)

( * ) Notice: Subject to any disclaimer, the term of this patent is extended or adjusted under 35 U.S.C. 154(b) by 0 days.

(21) Appl. No.: 12/737,184

(22) PCT Filed: Jun. 17, 2009

(86) PCT No.: PCT/IL2009/000602
§ 371 (c)(1),
(2), (4) Date: Apr. 1, 2011

(87) PCT Pub. No.: WO2009/153786
PCT Pub. Date: Dec. 23, 2009

(65) Prior Publication Data
US 2011/0178216 A1    Jul. 21, 2011

Related U.S. Application Data

(60) Provisional application No. 61/073,038, filed on Jun. 17, 2008.

(51) Int. Cl.
*C08K 5/49*   (2006.01)
*C08K 5/51*   (2006.01)

(52) U.S. Cl. .................................. 524/115; 524/149

(58) Field of Classification Search ............ 524/414, 524/417, 409, 115
See application file for complete search history.

(56) References Cited

U.S. PATENT DOCUMENTS

| | | | |
|---|---|---|---|
| 3,732,335 A | 5/1973 | Hermans et al. | |
| 4,210,735 A | 7/1980 | Hermans et al. | |
| 5,710,309 A | 1/1998 | Nishibori | |
| 2002/0169240 A1* | 11/2002 | Bar-Yakov et al. | 524/136 |

FOREIGN PATENT DOCUMENTS

| | | |
|---|---|---|
| EP | 1 239 005 | 9/2002 |
| WO | WO 2010/023236 | 3/2010 |

OTHER PUBLICATIONS

International Search Report for PCT/IL2009/000602, mailed Nov. 26, 2009.
Written Opinion for PCT/IL2009/000602, mailed Nov. 26, 2009.

* cited by examiner

*Primary Examiner* — Hui Chin
(74) *Attorney, Agent, or Firm* — Nixon & Vanderhye P.C.

(57) ABSTRACT

A polypropylene composition comprising polypropylene impact copolymer or impact modified polypropylene and an effective flame retarding amount of a mixture of (i) tris(tribromoneopentyl) phosphate and (ii) a carbon-carbon initiator, wherein the composition meets a UL 94 rating of V-1 or V-0, said composition being substantially free from antimony trioxide. A method for improving the flame retarding rating of a polypropylene composition is also disclosed.

12 Claims, No Drawings

POLYPROPYLENE BASED FORMULATIONS

This application is the U.S. national phase of International Application No. PCT/IL2009/000602 filed 17 Jun. 2009, which designated the U.S. and claims priority to U.S. Application No. 61/073,038, filed 17 Jun. 2008, the entire contents of each of which are hereby incorporated by reference.

The flammability characteristics of plastic materials are quantifiable according to the method specified by Underwriter Laboratories standard UL 94. The UL 94 ratings are V-0, V-1, and V-2 (a detailed description of the relevant flammability tests is given hereinafter). A material assigned with the V-0 rating is considered to be the less flammable. For certain applications the lower V-2 rating is acceptable, whereas for other applications the V-1 or the V-0 ratings are needed.

Polypropylene-based formulations can be rendered flame-retarded by the use a combination of a brominated flame retardant and antimony trioxide (which acts as a synergist). However, it is not easy to bring the polypropylene-based formulations to pass the UL 94 V-0 test without damaging the physical profile of the article made from the polypropylene polymer, especially from impact modified grades. Important properties of the final product that need to be considered in this regard are impact strength, light stability and surface appearance. For example, when the brominated flame retardant used is decabromodiphenyl ethane or decabromodiphenyl oxide, the polypropylene-based formulation typically contains at least 24% of the brominated compound in conjunction with 8% to 12% of antimony trioxide in order to pass the UL 94 V-0 test (wt % relative to the total weight of the polypropylene composition). This high loading of the flame retardant system (more than 30%) detrimentally alters the physical properties of the final product.

Tris(tribromoneopentyl) phosphate is a flame retardant additive represented by the following chemical structure:

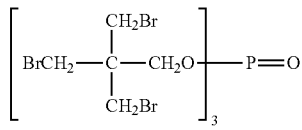

The preparation of Tris(tribromoneopentyl) phosphate is generally based on the reaction of three moles of tribromoneopentyl alcohol with 1 mol of a phosphorus oxyhalide under conditions well known in the art (see, for example, U.S. Pat. No. 5,710,309 and the references cited therein). The compound is also commercially available from ICL-IP (FR-370). Tris(tribromoneopentyl) phosphate is an aliphatic bromine-containing flame retardant (FR) having a high melting point (181° C.) and is suitable for use in the preparation of highly loaded master-batches.

A successful attempt to improve the suitability of Tris (tribromoneopentyl) phosphate for polypropylene-based formulations is described in US 2002/0169240, where tris(tribromoneopentyl) phosphate is combined with a free radical source. The incorporation of said combination into a polypropylene composition results in a product having excellent properties. The free radical source operable in the flame retardant system according to US 2002/0169240 is an organic compound which is stable at processing temperatures of about from 150° C. to about 250° C., and decomposes above these temperatures (at about from 220° C. to about 350° C.) to give relatively stable free radicals. Examples of free radical initiators are 2,3-dimethyl-2,3-diphenyl-butane and 2,3-dimethyl-2,3-diphenyl-hexane. More specifically, according to US 2002/0169240, a blend of tris(tribromoneopentyl) phosphate and a free-radical initiator was added together with antimony trioxide to polypropylene homopolymers, to afford UL 94 V-0 rated compositions (Examples 20 and 21 of US 2002/0169240). The aforementioned blend was also incorporated together with antimony trioxide into polypropylene copolymers, whereby UL 94 V-2 rated formulation was obtained, as illustrated in Example 15 of US 2002/0169240.

The use of a flame retardant system, which contains a brominated flame retardant and is free of antimony trioxide synergist (or contains only negligible amounts thereof) for retarding the flammability of a polypropylene-based composition has been considered impractical, since in the absence of said synergist the amount of the brominated compound needed to obtain UL 94 V-0 rating was considered to be unacceptably high, resulting in a final product having poor physical profile.

It has now been found that the normally beneficial antimony trioxide synergist acts unfavorably in polypropylene copolymer-based formulations (or in impact modified polypropylene-based formulations), that are flame retarded by the use of the combination of tris(tribromoneopentyl) phosphate and a free-radical initiator, as described in US 2002/0169240. Oddly enough, it has now been found that a UL 94 V-0 rating is attainable for such polypropylene-based formulations only when the amount of antimony trioxide is reduced, or more preferably, when said antimony trioxide is completely removed.

More specifically, it has been found that polypropylene copolymer-based composition which contains not less than 15%, and preferably not less than 16% tris(tribromoneopentyl) phosphate in combination with not less than 0.1%, and preferably not less 1.5% free-radical initiator, can successfully pass the UL 94 V-0 test, if the amount of antimony trioxide present in said composition is kept below 5%, and is practically reduced to negligible amounts. Particularly preferred workable concentration ranges for the antimony trioxide in the compositions of the invention are detailed hereinafter. Most preferably, the polypropylene copolymer-based composition of the invention is completely free of antimony trioxide.

As illustrated in the examples below, the total amount of the flame retardant system operable in the polypropylene copolymer-based composition, namely, the combination of tris(tribromoneopentyl) phosphate and a free-radical initiator, does not need to exceed 30%, and more preferably 25% or even 23% (wt % based on the total weight of the composition), in order to assure the desired UL 94 V-0 rating. Especially preferred concentration ranges of the tris(tribromoneopentyl) phosphate and the free-radical initiator in the compositions of the invention are 16-24 wt % (more preferably 16-22 wt % and even more preferably 16-wt %) and 0.5-3 wt % (more preferably 1-2.5 wt %), respectively. A benefit resulting from the low concentration of the FR system in the polypropylene copolymer-based composition of the invention is that articles produced from the composition can retain good physical attributes (for example, a density of about 1.00 g/cm$^3$ and tensile strength of about 22 MPa when measured according to the standard ASTM D-638-95).

The present invention is thus primarily directed to a polypropylene composition which comprises a polypropylene copolymer or impact modified polypropylene, and an effective flame retarding amount of a mixture of (i) tris(tribromoneopentyl) phosphate and (ii) carbon-carbon initiator, wherein the composition meets a UL 94 rating of V-1 or V-0, said composition being substantially free from antimony trioxide. By the term "substantially free from antimony trioxide" is meant that the weight concentration of antimony trioxide is generally between 0 and 3.0% by weight, preferably between 0 and 1.0% by weight, more preferably between 0 and 0.7% by weight, even more preferably between 0 and 0.5% by weight, and even more preferably between 0 and 0.3% by weight. An especially preferred antimony trioxide concentration range is between 0 and 0.1% (the weight % is relative to the total weight of the composition). As stated above, in its most preferred form, the polypropylene copolymer-based composition of the invention is completely free of antimony trioxide.

Polypropylene intended for use according to the invention are impact resistant grades. For instance such grades contain a propylene copolymer component, combined with a polypropylene homopolymer component, for improving the impact properties of the polymer. The copolymer component may be combined with the homopolymer component either chemically (at the polymerization stage, to form polypropylene block copolymer), or by melt-blending the polypropylene homopolymer component and an elastomer such as ethylene/propylene copolymer or ethylene/propylene/diene terpolymers, as described in more detail below. The two groups of polypropylenes described above are named herein "polypropylene impact copolymer" and "impact modified or resistant polypropylene", respectively.

Regarding the first class, a polypropylene impact copolymer that may be flame retarded according to the present invention is in the form of a block copolymer. The block copolymer comprises a first block (or phase), which is essentially the polypropylene homopolymer component and a second block (or phase), which is an ethylene-propylene copolymer component. The ethylene content in the polypropylene copolymer may be between 2 and 20% and is preferably between 5 and 15% (wt %). A polypropylene impact copolymer is produced by means of sequential polymerization reactions under conditions known in the art. The first reaction produces the homopolymer component and the second reaction produces the copolymer component. Thus, the copolymer component is chemically incorporated within the matrix of the homopolymer component. Different grades of polypropylene impact copolymer in the form of block copolymers are commercially available (Carmel Olefins, Israel, under the name Capilene® SE 50E, TR 50 and SL 50).

Regarding the second class, impact modified polypropylene can be prepared by admixing a polypropylene homopolymer and a rubber. The two components are blended in the form of pellets and then melt blended, extruded, and pelletized. The elastomeric impact modifier is generally an ethylene/propylene copolymer rubber (EPR) or ethylene propylene diene terpolymer rubber (EPDM). The diene(s) currently used in the manufacture of EPDM include DCPD (dicyclopentadiene), ENB (ethylidene norbornene) and VNB (vinyl norbornene).

A preferred polypropylene to be formulated according to the invention has melt volume index in the range between 0.2 and 40 $cm^3/10$ min, preferably between 0.5 and 30 $cm^3/10$ min, more preferably between 1 and 20 $cm^3/10$ min, as measured by a test identified specifically below. The processes for the preparation of various suitable polypropylene copolymers and impact modified polypropylene are described for instance in U.S. Pat. No. 4,210,735 and U.S. Pat. No. 3,732,335.

It is noted that the composition of the present invention may include polyolefins other than the polypropylene impact copolymer or the impact modified polypropylene specifically mentioned above. Preferably, however, the composition of the invention comprises not less than 50 wt %, and preferably not less than 70 wt %, and more specifically between 70 and 80 wt % polypropylene copolymer or impact modified polypropylene, or a mixture thereof.

The polypropylene copolymer-based composition comprises a flame retardant system, which is a mixture of (i) tris(tribromoneopentyl) phosphate and (ii) at least one radical source which is carbon-carbon initiator which begins to decompose, or decomposes to an appreciable extent, only at temperatures above 200° C., and preferably above 220° C. (e.g., in the range between 220° C. and 350°), to form carbon-based free radicals. The carbon-carbon initiator operative in the composition of the invention initiator is therefore essentially thermally stable under conditions employed at the manufacturing and processing of polypropylene compositions, and will exhibit its efficacy in generating radicals only under fire. From chemical structure perspective, the term carbon-carbon (C—C) initiators is used in the art to designate compounds having at least one carbon-carbon single bond that is elongated due to the presence of suitable neighboring groups, with the consequence that the sterically crowded carbon-carbon bond is unstable under heating. The C—C initiator is therefore capable of generating carbon-based free radicals upon breaking up along labile carbon-carbon single bonds, which are typically at least about 0.155 nm in length. Preferably, the C—C initiator is a hydrocarbon (composed only of carbon and hydrogen atoms), and more preferably a hydrocarbon which contains one or more aromatic rings. An especially preferred class of C—C initiators includes compounds composed of a carbon parent chain (which typically contains between 4 and 10 carbon atoms), with two adjacent carbon atoms which are each substituted with alkyl groups and phenyl rings (for example, if the parent carbon chain contains 2n carbon atoms, then the two adjacent carbon atoms which are substituted as set forth above are preferably the central atoms labeled n, n+1). Preferred C—C initiators for use in the present invention include 2,3-dimethyl-2,3-diphenylbutane, 3,4-dimethyl-3,4-diphenylhexane, and poly(1,4-diisopropylbenzene), commercially available from Peroxide Chemie (Interox C—C DFB) or Akzo Nobel (Perkadox 30).

It is a notable feature of the present invention that the amount of antimony trioxide in the polypropylene impact copolymer-based composition (or in the impact modified polypropylene-based composition) is kept below a certain threshold, rather than being kept above a minimal limit. The term "substantially free of antimony trioxide" accordingly indicates that antimony oxide is preferably absent from the polypropylene composition of the invention. However, a small amount of antimony trioxide may be included in the composition, provided, of course, that the presence of the antimony oxide does not adversely shifts the composition to the UL 94 V-2 classification. In particular, a small amount of antimony trioxide—generally below 5% (wt %) may be included in the composition in the case where a second flame retardant is used in addition to tris(tribromoneopentyl) phosphate. It is noted, however, that the advantages offered by the present invention are most readily obtained when tris(tribromoneopentyl) phosphate is used as the sole or as the major brominated flame retardant present in the polypropylene-based composition of the invention, thus allowing the amount of antimony trioxide to be reduced as much as possible (the term "major" is used herein to indicate that the weight percent of tris(tribromoneopentyl) phosphate is at least 50%, and preferably at least 70%, and more preferably at least 90% relative to the total weight of all brominated flame retardants present in the composition).

In addition to the polypropylene impact copolymer (or impact modified polypropylene), tris(tribromoneopentyl) phosphate and the free radical source (and optionally also other polyolefines and flame retarding agents as noted above), the composition of this invention may further contain conventional ingredients, such as pigments, UV stabilizers (e.g., benzotriazole derivative), heat stabilizers, fillers, lubricants, antioxidants (e.g., hindered phenol type) and the like, as listed in US 2002/0169240.

The compositions of the invention may be prepared as follows. The various ingredients of the composition are blended together according to their respective amounts. Generally, the ingredients are first dry blended using suitable mixing machines, such as Henschel mixer. Otherwise the ingredients can be fed simultaneously into the compounding equipment using continuous feeders. The resulting mixture may then be processed and compounded to form homogeneous pellets, for example, by using a co-rotating twin-screw extruder. The compounded pellets thus obtained are suitable for feed to an article shaping process such as injection molding, extrusion molding or filament extrusion for instance for the production of textiles. Process parameters such as barrel temperatures, melt temperature and screw speed as are described in more detail in the examples that follow.

It should be noted that the flame-retardant system of the present invention can be added to the polymer composition in several ways. First, they can be mixed directly with the polymers, as described above. They can also be incorporated in a "masterbatch", which is a composition comprising a suitable polymer carrier, and a relatively high proportion of the flame retardant system. Another aspect of the present invention therefore relates to a masterbatch composition suitable for use in the preparation of UL 94 V-1 or V-0 polypropylene impact copolymer or impact modified polypropylene formulation, said masterbatch comprises a polymer carrier and at least 30 wt %, and preferably at least 50 wt %, of a mixture of (i) tris(tribromoneopentyl)phosphate and (ii) a carbon-carbon initiator, wherein the masterbatch composition is characterized in that it is substantially free from antimony trioxide.

The carrier polymer contains one or more polymers which are combined with the flame-retardant system to form a masterbatch. The carrier polymer is intended to facilitate mixing of the masterbatch and improve the compatibility of the masterbatch and the blend polymer, which is the polymer combined with the masterbatch (in the present case, the blend polymer is polypropylene impact copolymer or impact modified polypropylene). Suitable carrier polymers are preferably identical with the blend polymer. The concentration of the flame retardant mixture in the masterbatch may be between 30 and 70 wt %, and the concentration of the carrier is between 28 and 68 wt %. In the context of a masterbatch composition, the term "substantially free from antimony trioxide" indicates that the concentration of the antimony trioxide in the masterbatch is such that upon blending the masterbatch with the polypropylene impact copolymer (or impact modified polypropylene), to form the polypropylene composition of the invention, then the concentration of the antimony trioxide in the final composition is kept below the limits set forth above. In practice, the weight ratio between the mixture of i) tris(tribromoneopentyl) phosphate and (ii) a carbon-carbon initiator, and the antimony trioxide, is not less than 10:1, and preferably not less than 15:1, and more preferably not less than 25:1. The masterbatch provided by the present invention is most preferably completely free from antimony trioxide.

The masterbatch composition of the invention may be provided in the form of essentially homogeneous pellets. The masterbatch is dry blended with suitable amounts of the blend polymer as defined above and remaining components. The resulting blend is extruded, pelletized and dried, to form the desired UL 94 V-1 or V-0 polypropylene impact copolymer or impact modified polypropylene compositions of the invention, which can be shaped (e.g., molded) as described above. In film applications, the masterbatch is preferably added to the polymer blend at about 20 to 50 wt %, more preferably about 30 to 45 wt %. In fiber applications, the masterbatch is preferably added to the polymer blend at about 20 to 40 wt %, more preferably about 20 to 30 wt %.

The polypropylene impact copolymer-based compositions and impact modified polypropylene-based compositions of the invention can be used for preparing injection molded products such as stadium seats, electrical parts (connectors, disconnectors and sockets), and electrical appliances, extrusion products such as profiles, pipes, sheets for roofing, films and boards for packaging and industry, insulation for cables and electric wires. Other examples of potential uses of the compositions of the present invention are fibers for a textile structure, carpets and upholstery. A thermoplastic article formed from the polypropylene-based composition of the invention set forth above (e.g., an injection molded article, an extrusion molded article, a fiber) forms another aspect of the present invention.

Specifically, for article shaping process which is based on injection molding, the present invention provides injection moldable, UL 94 V-0 rated polypropylene-based composition having a melt volume index greater by at least a factor of 1.5 (e.g., between 1.5-20, specifically between 1.5 and 3.0) than the melt volume index of the pure polypropylene copolymer starting material (or the pure impact-modified polypropylene) used for making the composition. More specifically, compositions having melt volume indices in the range of 1 to 50 $cm^3/10$ min, measured according to standard ASTM D1238-82 are provided by the present invention, upon starting from commercially available polypropylene impact copolymers with melt volume index in the range between 0.5 and 20 $cm^3/10$ min. More specifically, compositions having melt volume indices in the range of 25 to 50 $cm^3/10$ min are provided by the invention upon using commercially available polypropylene impact copolymers with melt volume index in the range between 10 and 20 $cm^3/10$ min. Furthermore, compositions having melt volume indices in the range of 7 to 10 $cm^3/10$ min are provided by the invention upon using commercially available polypropylene impact copolymers with melt volume index in the range between 0.5 and 3 $cm^3/10$.

The present invention is directed to UL 94 V-1 or V-0 rated polypropylene composition, which comprises a polypropylene impact copolymer or impact modified polypropylene, a flame retardant which is tris(tribromoneopentyl) phosphate and a flame retarding synergistic component, wherein said synergistic component consists essentially of a carbon-carbon initiator. The invention is further directed to a method for improving the flame retarding rating of a polypropylene composition, said composition comprising a polypropylene impact copolymer or impact modified polypropylene and a flame retardant which is tris(tribromoneopentyl) phosphate, wherein said method comprises incorporating a carbon-carbon initiator in said composition, wherein said composition is either free of antimony trioxide or comprises a minimal amount of antimony trioxide, as set forth above, namely, between 0 and 0.7% by weight, preferably between 0 and 0.5% by weight, more preferably between 0 and 0.3% by weight, and even more preferably between 0 and 0.1% (wt % relative to the total weight of the composition). Most preferably, the polypropylene copolymer-based composition of the invention is completely free of antimony trioxide. According to one embodiment of the invention, the tris(tribromoneopentyl)phosphate and the carbon-carbon initiator are provided in a masterbatch which is substantially free from antimony trioxide, as described above, wherein the masterbatch is combined with a blend polymer selected from the group consisting of polypropylene impact copolymer and impact modified polypropylene to form UL 94 V-1 or V-0 rated composition of the invention. Thus, the method of the invention allows the aforementioned compositions to attain improved, higher levels (ratings) of flame retardancy (moving from UL 94 V-2 rating to UL 94 V-1 or V-0 ratings). The following acceptable standards may also be used for measuring the improvement: DIN 4102 class B1, NF P 92-501 Class M1, BS 476 Part 7 Classes 1 and 2 and ASTM E-84 Classes I and II.

It should be noted that in order to determine whether a composition or an article made therefrom meets the UL 94 V-1 or V-0 rating according to the invention, the UL 94 test may be carried out on any acceptable thickness as commonly used in this test (0.4 mm, 0.8 mm, 1.6 mm or 3.2 mm). Preferred thicknesses are 0.8 mm or 1.6 mm, with 1.6 being more preferred.

EXAMPLES

General Preparation and Testing Procedures

The formulations having the compositions shown in the examples and tables below were weighted on Sartorius semi-analytical scales and mixed manually in a plastic bag (alternatively, the mixing operation can be done in any suitable equipment for the mixing of powders such as Loedige, Henschel or Papenmeyer low and high speed mixer).

After the mixing, the formulations having the compositions shown in the examples and tables are compounded and pelletized in a Berstorff ZE25 co-rotating twin-screw extruder, with L/D=32:1. The processing conditions to prepare and pelletize the compositions are summarized in Table 1. The polypropylene (PP) used is characterized by its melt flow index or melt volume index that are measured according to the standard ASTM D1238-82 at 230° C., with a load of 2.16 Kg.

TABLE 1

Compounding conditions

| PARAMETERS | UNITS | Set Values | Actual values |
|---|---|---|---|
| Temperature profile: | | | |
| Feed Zone Temp. (T$_1$) | ° C. | No heating | 100 |
| T$_2$ | ° C. | 180 | 187 |
| T$_3$ | ° C. | 160 | 161 |
| T$_4$ | ° C. | 180 | 183 |
| T$_5$ | ° C. | 190 | 190 |
| T$_6$ | ° C. | 190 | 193 |
| T$_7$ | ° C. | 180 | 186 |
| T$_8$ | ° C. | 200 | 200 |
| T$_9$ | ° C. | 225 | 216 |
| Temperature of melt | ° C. | | 221 |
| Screw speed | RPM | 350 | 350 |
| Ampere | A | 9 | 10 |
| Feeding rate | Kg/hour | 12 | 12 |

The pellets were dried at 70° C. for two hours in an air-circulating oven prior to injection molding on an Arburg Allrounder machine model 320S/500-150. Injection molding conditions to prepare test bars for property measurement are summarized in Table 2.

TABLE 2

Injection molding parameters

| PARAMETERS | UNITS | VALUES |
|---|---|---|
| Temperature profile: | | |
| T$_1$ (feeding zone) | ° C. | 200 |
| T$_2$ | ° C. | 210 |
| T$_3$ | ° C. | 220 |
| T$_4$ | ° C. | 230 |
| T$_5$ (nozzle) | ° C. | 230 |
| Mold temperature | ° C. | 40 |
| Injection pressure | Bar | 1300 |
| Holding pressure | Bar | 700 |
| Back pressure | Bar | 20 |
| Injection time | sec | 0.1 |
| Holding time | Sec | 10 |
| Cooling time | Sec | 5 |
| Mold closing force | KN | 500 |
| Filling volume (portion) | cm$^3$ | 17 |
| Injection speed | cm$^3$/sec | 20 |

The following properties were evaluated:

1) Flame-retardancy properties of the molded samples were measured using Underwriters-Laboratories standard UL 94, on thickness from 3.2 to 0.8 mm. In the UL 94 test, a specimen is exposed vertically to a flame for 10 seconds. The specimen is ignited at the bottom and burns up. If the specimen self-extinguishes within 30 seconds, another 10 seconds application is made. Flaming droplets are allowed to fall on cotton located below the sample. If the average burning time is less than 5 seconds (per application of flame) and the droplets do not ignite the cotton, the material is classified as UL 94 V-0. If the average of burning time is less than 25 seconds and the droplets do not ignite the cotton, the material is classified as UL 94 V-1. If the average burning time is less than 25 seconds but the droplets ignite the cotton, the material is classified as UL 94 V-2.

2) Accelerated weathering was made during 255 hours by UV radiation by using a QUV tester made by the Q Panel Company using 313 lamps and panel temperature of 55° C., on bars obtained through injection molding. The color change ΔDE of the test samples was recorded after the exposure time by a spectrophotometer type CIEL LAB.

3) Izod Notched impact energy was determined by a pendulum impact tester type 5102 ex Zwick according to standard ASTM D-256-81.

4) Tensile properties were determined by Universal Zwick 1435 material testing machine according to standard ASTM D-638-95.

5) Melt Flow Index (MFI) or Melt Volume Index (MVI) were measured according to standard ASTM D1238-82 as set forth above using Advanced Melt Flow Indexer (Rosand).

6) Blooming test was performed in circulating air oven ex Heraeus Instruments, aging for 7 and 14 days at 65° C. Degree assessed by wiping surface with a black cloth and visual inspection and evaluation of powder amount on cloth (blooming is the separation of the additive from the polymer matrix, which effects the surface appearance).

Examples 1-5 (Comparative)

Various commercially available flame retardants were incorporated into polypropylene copolymers according to the general procedures described above. The compositions prepared and the properties measured are summarized in Table 3 below.

FR systems also give rise to a certain extent of surface blooming with a consequent loss of surface appearance.

TABLE 3

| Composition (Wt. %) | Example | | | | |
|---|---|---|---|---|---|
| | 1 | 2 | 3 | 4 | 5 |
| | | | FR Type | | |
| | PP ref. no FR | FR-1210 (Decabromo diphenyl oxide; ICL-IP) | Commercial grade of Decabromo Diphenyl ethane | FR-20 120 (Magnesium hydroxide surface treated; ICL-IP) | Commercial grade of ammonium polyphosphate based FR |
| PP copolymer Capilene TR 50 (Carmel Olefins) | 100 | 58.1 | 58.6 | 33.5 | 61.5 |
| FR | — | 27.9 | 27.4 | 64 | 36 |
| Antimony trioxide | — | 11.5 | 11.5 | — | — |
| Tinuvin 327 * | — | 0.3 | 0.3 | 0.3 | 0.3 |
| Titanium dioxide TiO2 (pigment) | — | 2.0 | 2.0 | 2 | 2 |
| Heat Stabilizer B-245 | — | 0.2 | 0.2 | 0.2 | 0.2 |
| Total FRs loading Properties: | | 39.4 | 38.9 | 64 | 36 |
| UL-94 (1.6 mm) Class | Not rated | V-0 | V-0 | V-0 | V-0 |
| Density g/cm³ | 0.905 | 1.28 | 1.30 | 1.57 | 1.08 |
| MVI, (230° C., 2.16 Kg) cm³/10 min | 16 | 10 | 9 | 7 | 14 |
| Tensile strength, MPa | 23 | 18 | 20 | 15 | 15 |
| Elongation at break, % | 760 | 45 | 44 | 1 | 30 |
| Izod notched impact, J/m | 550 | 107 | 131 | 52 | 55 |
| Blooming | No | Medium | Slight | Slight | Slight |
| UV stability, ΔDE | ** | 33 | 20 | 3 | <2 |

* Benzotriazole type of UV absorber
** Not applicable

Example 1 is given as a reference without any FR for comparison purpose. As illustrated by the data in Table 3, a high loading (between 36 and 64%) of the tested flame retardants is needed to get a UL 94 class V-0 (1.6 mm). The FR systems tested in Examples 2-5 reduce significantly the melt volume index (MVI) of the composition, and significantly limit the processability and the injection moldability of the compositions. An important increase of the density of the molded parts produced with these FR systems is also observed: between approximately 20 and 70%.

Moreover, impact properties drop severely and molded parts are very brittle and have limited applications. All these Examples 6 to 10 (Comparative)

Using the same processing, molding and testing conditions as in Examples 1 to 5, additional formulations were compounded and molded and their fire retarding properties were tested, in an attempt to arrive at polypropylene copolymer-based composition meeting the UL 94 V-0 rating. The data is tabulated in Table 4.

TABLE 4

| Composition wt. % | Example | | | | |
|---|---|---|---|---|---|
| | 6 | 7 | 8 | 9 | 10 |
| | | | FR type | | |
| | FR-720 [Tetrabromobisphenol A-bis(2,3 dibromopropyl ether); ICL-IP] | | | FR-370 [Tris(tribromoneopentyl) phosphate; ICL-IP] | |
| PP copolymer Capilene SR-50 | 77.8 | 79.5 | 56.5 | 67.5 | 49.3 |
| FR | 14.5 | 18 | 41 | 21.8 | 35.7 |
| Antimony trioxide | 5.2 | — | — | 8.2 | 12.5 |
| Tinuvin 327 | 0.3 | 0.3 | 0.3 | 0.3 | 0.3 |
| Titanium dioxide TiO2 | 2 | 2 | 2 | 2 | 2 |
| Heat Stabilizer B-245 | 0.2 | 0.2 | 0.2 | 0.2 | 0.2 |
| Total FRs loading Properties: | 19.7 | 18 | 41 | 30 | 48.2 |
| UL-94 (1.6 mm) Class | V-0 | Non rated | V-2 | V-2 | V-2 |
| Density g/cm³ | 1.04 | | | Not measured | |
| Tensile strength, MPa | 22 | | | Not measured | |
| Elongation at break, % | 39 | | | Not measured | |

TABLE 4-continued

| | Example | | | | |
|---|---|---|---|---|---|
| | 6 | 7 | 8 | 9 | 10 |
| | | | FR type | | |
| Composition wt. % | | FR-720 [Tetrabromobisphenol A-bis(2,3 dibromopropyl ether); ICL-IP] | | FR-370 [Tris(tribromoneopentyl) phosphate; ICL-IP] | |
| Izod notched impact, J/m | 83 | | Not measured | | |
| Blooming | Heavy | | Not measured | | |
| UV stability, ΔDE | 6 | | Not measured | | |

Two flame-retardants, which contain aliphatic bromine atoms, were tested in Examples 6 to 10: FR-720, chemically named Tetrabromobisphenol A-bis(2,3 dibromopropyl ether) and tris(tribromoneopentyl) phosphate (FR-370). It is apparent that although a polypropylene copolymer composition comprising the combination of FR-720 (modified TBBA) and antimony trioxide was classified V-0 according to the UL 94 test (Example 6), the composition experiences heavy blooming and the impact properties and surface appearance of the molded parts made from said composition are poor.

As to the other formulations illustrated in Examples 7 to 10, none of them was classified as V-0 according to the UL 94 test. It is important to note that if antimony trioxide is not used in combination with FR-720, as in Example 8, then even a 41% loading of the bromine containing FR is not sufficient to arrive at V-0 rated composition. This observation clearly illustrates that if the polypropylene copolymer based-composition is flame retarded by the use of FR 720, then antimony trioxide indeed acts as an essential powerful synergist, which favorably cooperates with the brominated FR (unfortunately, however, without retaining the desired physical profile of the final article, as noted above with respect to Example 6).

As to the second flame retardant, FR-370, this fully aliphatic bromine containing flame retardant failed in bringing a polypropylene copolymer composition to the desired UL 94 V-0 rating, even when supported by high loadings of antimony trioxide.

Example 11 (Comparative) and 12 (of the Invention)

Using the same processing, molding and testing conditions as in Examples 1 to 5, additional formulations were compounded and molded and their fire retardancy was tested, in order to assess the efficacy of the combination of tris(tribromoneopentyl) phosphate and C—C initiator in retarding the flammability of polypropylene copolymers based-compositions. The data is tabulated in Table 5.

TABLE 5

| | Example | | |
|---|---|---|---|
| | 1 | 11 | 12 |
| | | FR Type | |
| Composition (wt %) | PP reference (no FR) | FR-370 [Tris(tribromoneopentyl) phosphate] | |
| PP copolymer Capilene TR 50 (Carmel Olefins) | 100 | 72.5 | 78.5 |
| FR | — | 17 | 17 |
| Antimony trioxide | — | 6 | — |
| 2,3-dimethyl-2,3 | — | 2 | 2 |

TABLE 5-continued

| | Example | | |
|---|---|---|---|
| | 1 | 11 | 12 |
| | | FR Type | |
| Composition (wt %) | PP reference (no FR) | FR-370 [Tris(tribromoneopentyl) phosphate] | |
| diphenyl butane (CCDFB-90 - Peroxid Chemie) | | | |
| Tinuvin 327 | — | 0.3 | 0.3 |
| Titanium dioxide TiO2 | — | 2 | 2 |
| Heat Stabilizer B-245 | — | 0.2 | 0.2 |
| Total FRs loading | | 25 | 19 |
| Properties: | | | |
| UL-94 Class | Not rated | V-2 (1.6 mm) | V-0 (0.8 mm; 1.6 mm & 3.2 mm) |
| Density g/cm$^3$ | 0.905 | 1.07 | 1.00 |
| MVI, (230° C., 2.16 Kg) cm$^3$/10 min | 16 | 22 | 32 |
| Tensile strength, MPa | 23 | 15.8 | 22 |
| Elongation at break, % | 760 | 350 | 390 |
| Izod notched impact, J/m | 550 | 200 | 213 |
| Blooming | No | No | No |
| UV stability, ΔDE | Not applicable | <2 | <2 |

Example 1 is a general reference example containing no FR. As illustrated by Examples 11 and 12, in the presence of the antimony trioxide synergist, the combination of tris(tribromoneopentyl) phosphate and C—C initiator fails to impart the desired UL 94 V-0 rating to PP copolymers (Example 11), while the corresponding polypropylene formulation of Example 12, which is free of antimony trioxide, surprisingly passes the UL 94 V-0 test (over the entire range of thicknesses, namely, 0.8 mm, 1.6 mm and 3.2 mm).

Furthermore, as shown in Example 12, the desired UL 94 V-0 rating is attainable for a polypropylene copolymer-based formulation using relatively low loading of the FR system (the combination of tris(tribromoneopentyl) phosphate and C—C initiator). The low loading of the FR system (19% w/w) and the absence of the dense antimony trioxide contributes to the reduction of the density of the final product. Other important properties of the polypropylene based formulation that are favorably modified as a result of the removal of the antimony trioxide synergist are as follows:

1) The melt flow. The resulting formulation according to the invention has MVI of 32, and accordingly, the improved melt flowability allows articles to be injection molded into complicated geometrical shapes.

2) The Izod notched impact. As shown by Example 12 prepared according to the invention, the resulting Izod notched impact is high, allowing the use of the product under heavy duty conditions.

3) Surface appearance. Example 12 prepared according to the invention illustrates that samples exposed to severe light exposure during several months retain their good surface appearance and were not discolored. Moreover, it is also a benefit of this invention that even after thermal aging, the FR systems do not exhibit surface migration, thus good surface appearance of the objects is maintained.

Examples 13 (of the Invention) and 14 (Comparative)

Using the same processing, molding and testing conditions as in Examples 1 to 5, additional formulations were compounded and molded and their fire retardancy was tested, in order to assess the efficacy of the combination of tris(tribromoneopentyl) phosphate and C—C initiator in retarding the flammability of PP copolymers. The data is tabulated in Table 6.

TABLE 6

| | Example | |
|---|---|---|
| | 13 | 14 |
| | | FR Type |
| Composition | | FR-370 |
| Wt. % | [Tris(tribromoneopentyl) phosphate] | |
| PP copolymer Capilene TR 50 (Carmel Olefins) | 79.5 | 73.5 |
| FR | 16.2 | 16.2 |
| Antimony trioxide | — | 6 |
| 2,3-dimethyl-2,3 diphenyl butane (CCDFB-90 - Peroxid Chemie) | 1.8 | 1.8 |
| Tinuvin 327 | 0.3 | 0.3 |
| Titanium dioxide TiO2 | 2 | 2 |
| Heat Stabilizer B-245 | 0.2 | 0.2 |
| Total FRs loading | 18 | 24 |
| Flame retardancy: | | |
| UL-94 (1.6 mm) Class | V-0 | V-2 |

Examples 15 and 16 (Both of the Invention)

Using the same processing, molding and testing conditions as in Examples 1 to 5, additional formulations were compounded and molded and their fire retardancy was tested, in order to assess the efficacy of the combination of tris(tribromoneopentyl) phosphate and C—C initiator in retarding the flammability of PP copolymers in the absence of antimony trioxide, or in the presence of a small amount of antimony trioxide. The data is tabulated in Table 7.

TABLE 7

| | Example | |
|---|---|---|
| | 15 | 16 |
| Composition | FR-370 | |
| (Wt. %) | [Tris(tribromoneopentyl) phosphate] | |
| PP block copolymer (Carmel Olefins SL 50 MFI = 7) | 75.9 | 75.8 |
| FR | 21.6 | 21.6 |
| 2,3-dimethyl-2,3 | 2.4 | 2.4 |

TABLE 7-continued

| | Example | |
|---|---|---|
| | 15 | 16 |
| Composition | FR-370 | |
| (Wt. %) | [Tris(tribromoneopentyl) phosphate] | |
| diphenyl butane (CCDFB-90 - Peroxid Chemie) | | |
| Antimony trioxide | — | 0.1 |
| Irganox 1010 | 0.1 | 0.1 |
| Total FRs loading | 24 | 24.1 |
| Flame retardancy: | | |
| UL-94 0.8 mm | | |
| Max. burning time, sec | 1 | 1 |
| Total burning time, sec | 10 | 10 |
| Number of cotton ignition | 0 | 0 |
| class | V-0 | V-0 |

The invention claimed is:

1. A polypropylene composition comprising polypropylene impact copolymer or impact modified polypropylene and an effective flame retarding amount of a mixture of (i) tris(tribromoneopentyl)phosphate and (ii) a carbon-carbon initiator, wherein the concentration of antimony trioxide in the composition is in the range from 0 to 0.3 wt %, such that said composition meets a UL 94 rating of V-1 or V-0.

2. A composition according to claim 1, which comprises not less than 70% (w/w) polypropylene impact copolymer or impact modified polypropylene, wherein the concentrations of (i) the tris(tribromoneopentyl)phosphate and (ii) the carbon-carbon initiator are not less than 16% and 0.1%, respectively, with the sum of the concentrations of (i) and (ii) being not more than 30%, relative to the total weight of the composition, wherein the composition is UL 94 V-0 rated.

3. A composition according to claim 2, wherein the concentration of tris(tribromoneopentyl)phosphate is between 16 and 24 wt % and the concentration of the carbon-carbon initiator is between 0.5 and 3 wt %.

4. A composition according to claim 1, wherein the concentration of the antimony trioxide is in the range between 0 and 0.1 wt %.

5. A composition according to claim 1, which is free of antimony trioxide.

6. A composition according to claim 1, wherein the polypropylene is polypropylene impact copolymer.

7. A composition according to claim 6, which has a melt volume index greater by at least a factor of 1.5 than the melt volume index of the polypropylene impact copolymer starting material used for making the composition.

8. A composition according to claim 7, wherein the polypropylene impact copolymer starting material has a melt volume index in the range between 0.5 and 20 cm$^3$/10 mm, and wherein the composition has a melt volume index in the range of 1 to 50 cm$^3$/10 mm, measured according to standard ASTM D1238-82.

9. A method for improving the flame retarding rating of a polypropylene composition, said composition comprising a polypropylene impact copolymer or impact modified polypropylene, and a flame retardant which is tris(tribromoneopentyl)phosphate, wherein said method comprises incorporating a carbon-carbon initiator in said composition, wherein said composition is either free of antimony trioxide or comprises a minimal amount of antimony trioxide of not more than 0.3 wt %.

10. A method according to claim 9, wherein the amount of antimony trioxide is in the range between 0 and 0.1 wt %.

11. A method according to claim 9, wherein the tris(tribromoneopentyl)phosphate and the carbon-carbon initiator are provided in a masterbatch which is substantially free from antimony trioxide, wherein the masterbatch is combined with a blend polymer selected from the group consisting of polypropylene impact copolymer and impact modified polypropylene to form UL 94 V-1 or V-0 rated composition.

12. A thermoplastic article formed from the polypropylene composition of claim 1.

* * * * *